Dec. 26, 1961      L. D. SOUBIER      3,014,313
METHOD AND APPARATUS FOR FEEDING CHARGES TO MOLDS
Filed March 10, 1958      3 Sheets-Sheet 3
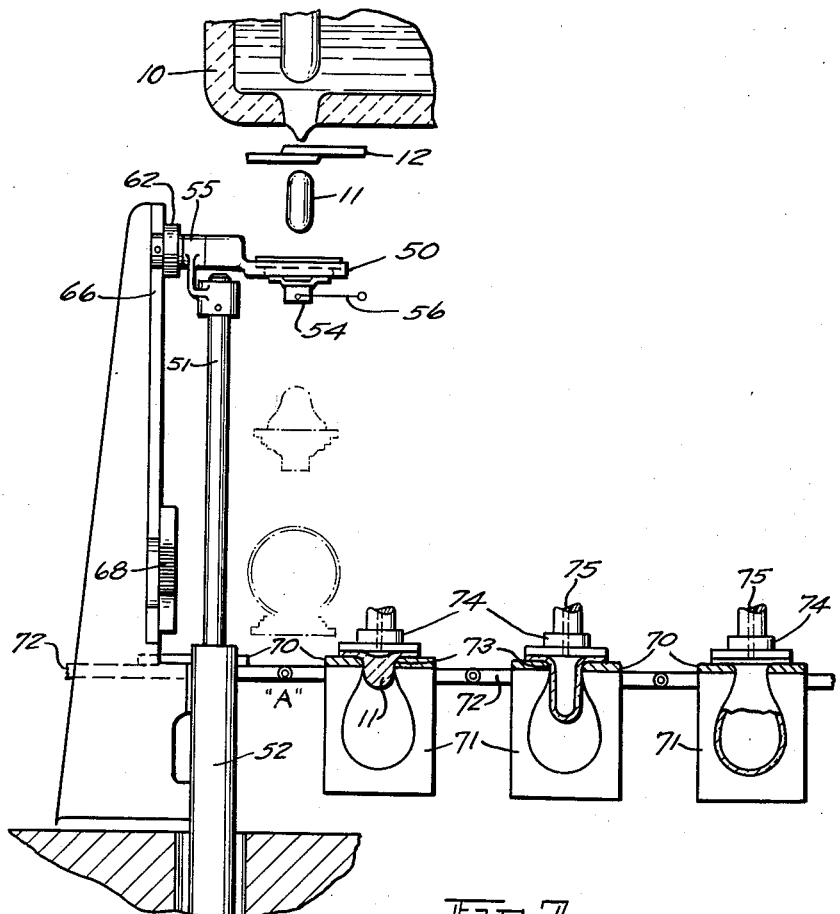
Fig. 7.
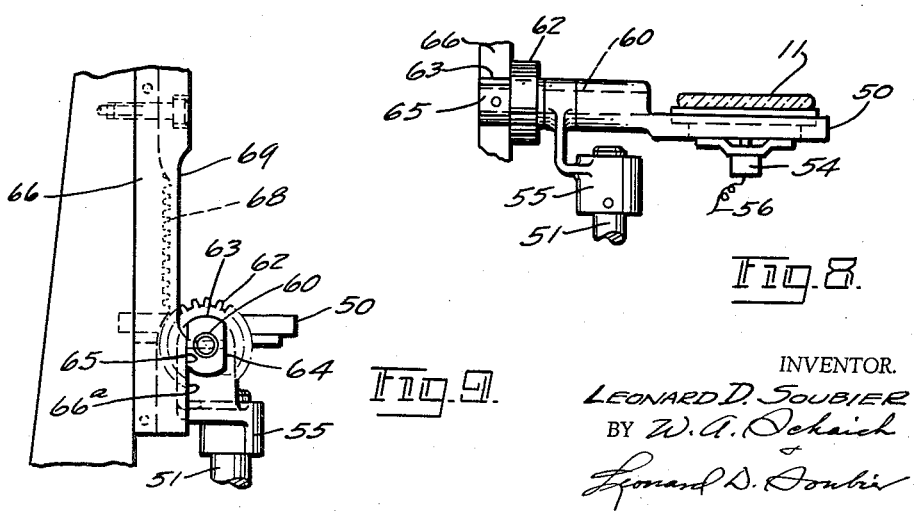
Fig. 8.
Fig. 9.
INVENTOR.
LEONARD D. SOUBIER
BY
ATTORNEYS United States Patent Office 3,014,313
Patented Dec. 26, 1961

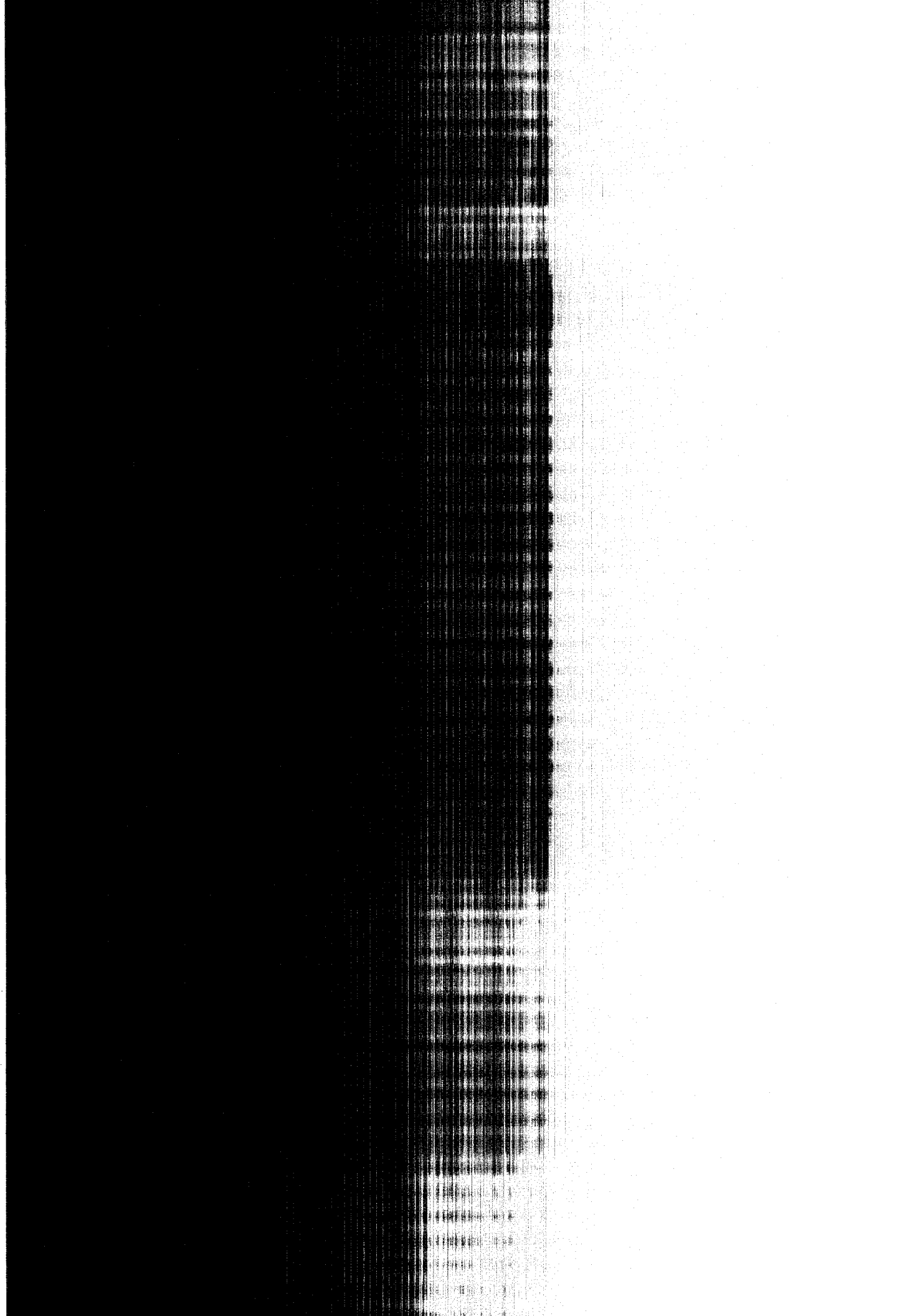

3,014,313
METHOD AND APPARATUS FOR FEEDING CHARGES TO MOLDS
Leonard D. Soubier, Toledo, Ohio, assignor to Owens-Illinois Glass Company, a corporation of Ohio
Filed Mar. 10, 1958, Ser. No. 720,124
9 Claims. (Cl. 49—5)

My invention relates to a method and an apparatus for the loading of charges of heated or plastic-like materials into shaping or forming molds and in particular to the loading of molds wherein the shaping surfaces thereof have, or may be in motion relative to the charge at the time it is being supplied thereto.

This invention has primary application in the glass field and in particular to the supplying of charges of molten glass to the molds of glass shaping machines. As a specific example of the application of this invention, reference is made to the production of cathode tubes and in particular to the production of the funnel shaped portions theerof. Presently such funnels are produced by a centrifugal casting method which requires that the mold for casting same must be at rest, or so nearly so, when the charge is delivered thereto, that the chage may readily seek and become level due to the force of gravity. Next the mold must remain at rest for a period of time sufficient to permit all of the glass in the delivered charge to seek its natural gravitational level, otherwise the control of the thickness of the walls of the tube will be lost in the succeeding centrifugal casting operation. This waiting period prior to spinning or centrifuging is time completely lost to production and, of course, makes the production cost per piece considerably higher than necessary. Further, the necessity of waiting for the glass of the charge to level out prior to spinning not only also causes the loss of control of the wall thickness of the article in those areas where the resting or leveling glass is in standing contact with the mold walls but also increases the time period required for total spinning due to the cessation of mold rotation. Because of this extra length of glass to mold contact, the walls of the article must of necessity be thicker in those wall contacting areas than elsewhere in the article. Consequently these areas of glass to mold contact are impossible of any regulated thickness control, particularly when there is used the present commercial method of feeding the charge of glass to the mold, which permits the molten glass to rest in mold wall contact prior to spinning.

The present production methods involve dropping a charge or gob of molten glass into a mold and, of course, precaution is taken to deliver same approximately centrally of the mold. However, the presently used methods of delivery add to the trouble of off-center delivery rather than to the obviation thereof. The present method of charging the casting molds inherently leads to these mentioned disadvantages. For example, regardless of the precautionary effort expended to prevent off-center delivery of the charge of molten glass, the majority of the charges are nevertheless off-center. As a consequence, the waiting period to permit the charge to level by gravity is a standard requirement in the operation. The difficulties inherent thereto have been previously set forth above. Many expedients have been tried to obviate these troubles but such expedients lead to other difficulties equally as bad. For example, to cut down the duration of the level waiting period and possibly the lessening of its consequent chill effects, the temperature of the charge has been increased. However, this requires resort to further expedients because the glass being of higher viscosity, is more liquid and will climb the mold walls with greater rapidity with the mold rotating at the same speeds used with a more viscous or lower temperature glass.

Beyond this, when the glass is at this higher temperature, the need for central delivery to the mold becomes of even greater necessity because of the rapidity with which the centrifugal forces become effective upon the molten glass.

Regardless of these available expedients, the problem of exact center loading is still a vexing problem to the industry concerned with producing cathode tubes. For example, in the free dropping of a gob of molten glass, the gob need only be off center a slight amount and then because of the viscosity inherent or consonant to the proper working temperature of the glass, it will require a longer time interval to level and settle to the gravity level required prior to initiating the spinning action. Thus the timing of the start of the mold rotation must always be sufficiently slow or delayed to allow for the greatest gob delivery deviation from mold center. The same conditions are also true of other presently known gob delivery methods. As a consequence of the above, the present invention is provided to accomplish several objectives among which is the obviation of any need of a waiting period for the gob to seek its gravity level with its inherent or unavoidable adverse effects upon control of wall thickness of the article.

A further object is to provide a method of gob or charge delivery wherein there is no need to stop the rotation of the centrifugal mold during and after the charge delivery.

Another object is to provide a method of charge delivery which not only leads to but insures control of distribution of the glass of the charge throughout the walls of the article.

A still further object is to provide control of the movement of the glass of the charge during delivery thereof to the mold.

Other objects will be apparent from the following disclosures.

In the drawings:

FIG. 1 is an elevational view, in partial section, showing the general arrangement of the mechanism involved including the gob feeder, the gob guide, the centrifugal mold and its drive;

FIG. 2 is similar to FIG. 1 but shows the gob, per se, and the gob guide on the way to delivery of the gob;

FIG. 3 is an enlarged sectional elevation through the mold and gob guide, illustrating the centering of the guide and gob with respect to the mold center;

FIG. 4 illustrates the issuance of the gob from the guide to and on the center of the mold;

FIG. 5 illustrates the contact of the gob with the moving mold;

FIG. 6 illustrates the scoring device adapted to cooperate with the moving mold;

FIG. 7 is a modification wherein a charge or gob is delivered to and centered in and upon a mold cavity;

FIG. 8 is an enlarged illustration of a portion of the inversion mechanism of FIG. 7; and FIG. 9 is a further enlargement of portions of the same mechanism of FIG. 7.

Referring to the drawings and in particular to FIG. 1 thereof, 10 is a gob feeder of the usual well known type adapted to feed measured quantities of molten glass to a forming machine. A shearing mechanism 12 of the usual type is provided to sever and set in motion charges of molten glass for delivery in timed sequence to the forming molds 14, which are adapted to be brought into alignment with the outlet of the gob feeding device 10 by rotation of table 13. The mold 14 is mounted upon a standard 15 journaled in a table support 13 for rotation about its own vertical axis, and driven by a hydraulic motor 17 through gears 18 and 19 at one end of the standard 15.

The rotation of mold 14 is continuous for a period of and motor 52 are connected to and support the guide 50 by a bracket 55 attached to the piston 51.

The downward movement of guide 50 is such that it moves slightly slower than the normal or free drop rate of the gob 11 and results in the molten glass of the gob coming into seeming contact with guide 50. The guide 50 is vibrated at an extremely high speed by a vibrator 54 which may be vibrated either electrically or by air supplied through a flexible length of conduit 56.

In addition to this vibration, the guide 50 is arranged for rotation in a moving horizontal plane and about the horizontal axis of shaft 60. This rotation may occur when the gob 11 has flattened out approximately as shown in FIG. 8, which should be approximately at a point just prior to reaching the moving molds 70 and 71.

The molds 70 and 71 may be continuously moved by and on a conveying mechanism 72. This mold movement requires timing as between the severing of the gob 11 and the presentation of a neck mold 70 at the position "A" (FIG. 7) for the reception of the gob 11 from the guide 50. Such timing will permit the gob to be dropped and be centered over the cavity in neck mold 70.

In order to discharge the gob 11 from guide 50, it is necessary to revert the position of the guide between the time it receives gob 11 and the discharge point of said gob therefrom. Thus the guide 50 is mounted upon a horizontal shaft 60 which carries a gear 62 pinned thereto. The hub 63 of said gear is provided with two oppositely disposed flat spots 64 and 65 arranged to alternately contact a control plate 66 and thus maintain a predetermined position of guide 50. For example, in FIG. 9, the surface 65 of hub 63 is in contact with the surface 66ª of plate 66, which will maintain the guide 50 in a position to discharge gob 11 at the position "A" of FIG. 7. As the guide 50 is being returned to its upper gob receiving position from that shown in FIG. 9, the piston 51 is moved upwardly by cylinder 52, the surface 65 of hub 63 leaves surface 66ª and the teeth of gear 62 contact the teeth of a rack 68. A depression 69 in control plate 66 then permits the gear 62 to rotate and in turn rotate guide 50 about the center of the shaft 60, thereby bringing the hub surface 64 into contact with control plate 66 and maintaining the guide 50 in gob receiving position as shown in FIG. 7. On the downward movement the gear 62 is controlled and rotated in the same manner.

This above described mechanism permits a gob 11 to be severed from its source, to freely drop a certain distance and then be brought into both drop and shape control by the guide 50. This guide, because it is vibrated at high speed, may be brought into seeming or apparent contact with the gob without any detrimental effect upon its temperature and at the same time through its percussion contact therewith to shape the gob to conform to the mold shape. Thus a charge of molten glass may be supplied from a source of molten glass, it may be guided to and centered in a mold and it may also have some measure of shaping imparted thereto during such guidance without detrimentally affecting the working temperature thereof and at the same time insuring its delivery to the exact center of the receiving mold. As the gob is released from guide 50, it drops in centered position upon the moving neck mold 70 and portions thereof will immediately sag through opening 73 and will continue to sag and stretch into the inner confines of the finishing mold 71. Immediately thereafter a blowhead 74 is seated thereon, pinching the glass between it and the top surface of neck mold 70 while blowing air is admitted through opening 75 in blowhead 74 to expand the glass to the cavity of the finishing mold 71. Thus, from the time the gob 11 is severed from its source of supply and started in motion by dropping toward mold 70, at least some portion thereof is continuously moving, in at least one direction, until the article has reached its final molded shape.

Modifications may be resorted to within the spirit and scope of the appended claims.

I claim:

1. An apparatus for forming shaped glass articles from molten glass including in combination a device for separating and dropping a gob of said molten glass, a glass receiving mold spaced from said device and arranged to receive said gob, a combined gob guiding and shaping means consisting of a hollow frusto-conical sleeve interposed between said device and said mold, means to cause said gob guide to move alternately into and out of gob guiding relationship to said mold, means to impart percussive shaping action to said guide, and means causing the glass to be shaped in said receiving mold.

2. An apparatus for forming shaped glass articles from molten glass including in combination a device for separating and dropping a gob of said molten glass, a glass receiving mold spaced from said device and arranged to receive said gob, a combined gob guiding and shaping means consisting of a hollow frusto-conical funnel interposed between said device and said mold, means to cause said gob guide to move alternately into and out of gob guiding relationship to said mold, vibratory means to impart shaping action to said guide, and means to rotate said mold about its own vertical axis.

3. An apparatus for forming shaped glass articles from molten glass including in combination a device for separating and dropping a gob of said molten glass, a glass receiving mold spaced from said device and arranged to receive said gob, a combined gob guiding and shaping means interposed between said device and said mold, means to cause said gob guide to move alternately into and out of gob guiding relationship to said mold, means to impart shaping action to said guide, and means to expand the glass to the confines of the said mold.

4. An apparatus for forming shaped glass articles from molten glass including in combination a device for separating and dropping a gob of said molten glass, a glass receiving mold spaced from said device and arranged to receive said gob, a frusto-conical funnel member adapted to guide and center said gob in said mold, means to vibrate said funnel member, means to move said funnel member to and from gob guiding relationship with respect to said mold, and means to rotate said mold at a speed sufficient to shape the glass by centrifugal force.

5. The method of controlling the distribution of thermoplastic material in forming the walls of a molded article comprising the steps of severing and setting in gravitational motion a measured charge of thermoplastic material in workable form for delivery to a shaping mold, maintaining at least a portion of said charge in continued gravitational motion while applying vibrational forces thereto by intermediate shaping surfaces, said vibrational forces being applied in at least one direction relative to the molding surfaces of said mold, and shaping said charge of thermoplastic material into final form within said mold.

6. The method of controlling the distribution of thermoplastic material in forming the walls of a molded article comprising the steps of severing and setting in gravitational motion a measured charge of thermoplastic material for delivery into a shaping mold, maintaining at least a portion of said charge in continued gravitational motion in a vertical direction while applying vibrational forces thereto acting in a plurality of directions relative to and prior to contacting the shaping surfaces of said mold, and shaping said charge of thermoplastic material into final form within said mold.

7. The method of controlling the distribution of glass in forming the walls of a molded hollow glass article comprising the steps of severing and dropping a measured charge of molten glass by gravity toward an upwardly-facing open mold, applying vibrational forces by intermediate vibratory shaping surfaces to said charge during its downward motion prior to its contacting the mold shaping surfaces, directing contiguous portions of said charge into said mold guided by said gravitational and vibrational forces acting in concert, and shaping said charge of molten glass into final form within said mold.

8. The method in accordance with claim 7, wherein the said shaping of said charge of molten glass is effected by the combined forces of gravity and pneumatic pressure.

9. The method of controlling the distribution of glass in the walls of a molded hollow glass article comprising the steps of severing a pendent charge of molten glass from a supply source, dropping said charge under the influence of gravity toward an upwardly-facing open-ended mold, and directing the continuous movement of contiguous portions of said charge into mold contacting and finally formed relation by the controlled application of combined gravitational, vibrational and centrifugal forces.

References Cited in the file of this patent

UNITED STATES PATENTS

| | | |
|---|---|---|
| 896,631 | Dixon et al. | Aug. 18, 1908 |
| 1,356,174 | Soubier | Oct. 19, 1920 |
| 1,482,760 | Milliken | Feb. 5, 1924 |
| 1,629,926 | Peiler | May 24, 1927 |
| 1,629,940 | Weaver | May 24, 1927 |
| 1,807,336 | Clark | May 26, 1931 |
| 2,041,222 | Bates | May 19, 1936 |
| 2,301,134 | Meyers | Nov. 3, 1942 |
| 2,388,876 | Smith | Nov. 13, 1945 |
| 2,478,624 | DeVine | Aug. 9, 1949 |
| 2,662,346 | Giffen | Dec. 15, 1953 |
| 2,669,806 | Walle, et al. | Feb. 23, 1954 |
| 2,717,474 | Barradel-Smith | Sept. 13, 1955 |

Dec. 26, 1961 E. H. NOVAK 3,014,314
LENS EDGER
Filed May 27, 1959 3 Sheets-Sheet 1
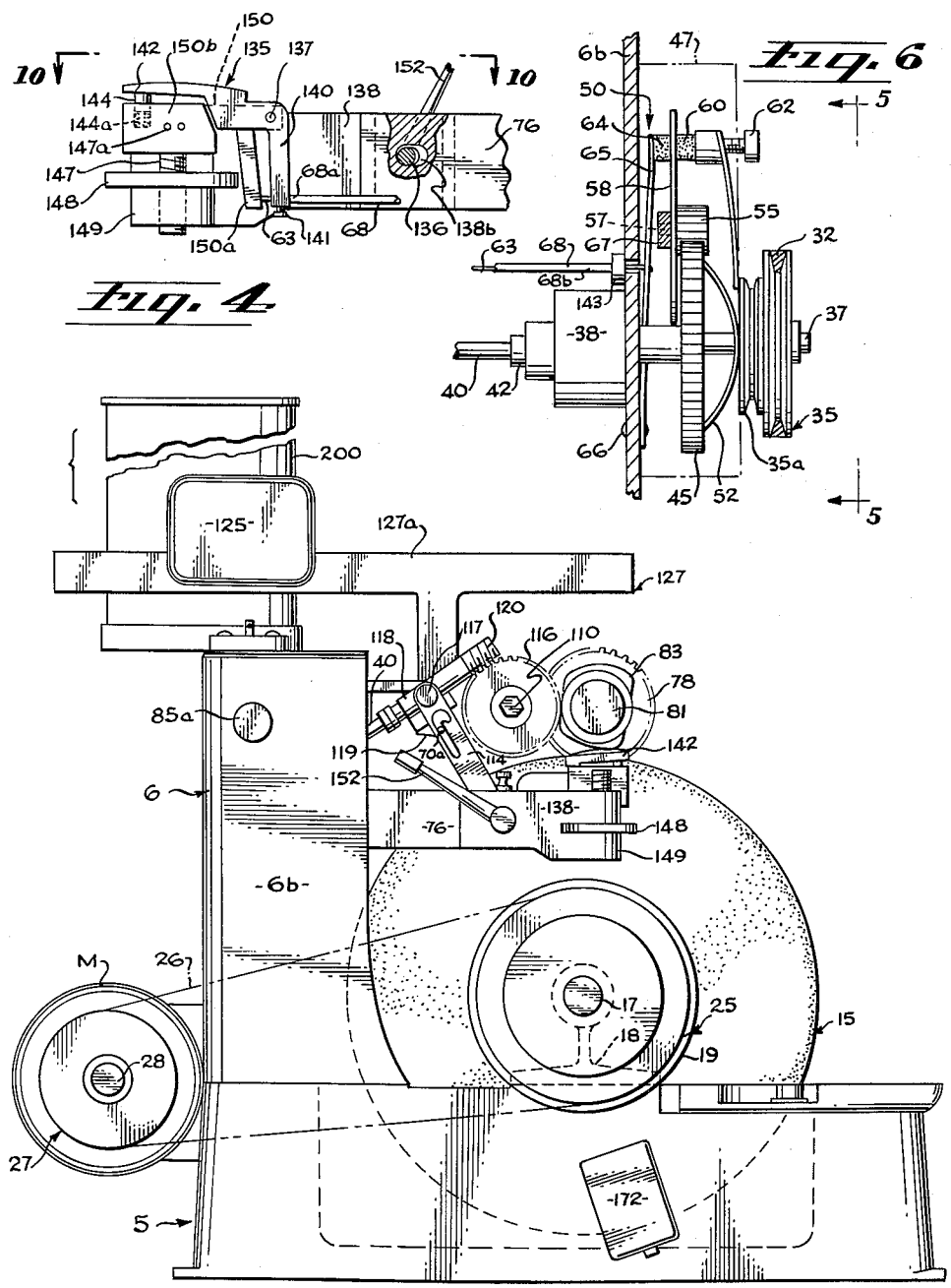
EZRA H. NOVAK
INVENTOR.
BY Mason & Graham
ATTORNEYS